US007269618B2

(12) United States Patent
Nakajima (10) Patent No.: US 7,269,618 B2
(45) Date of Patent: Sep. 11, 2007

(54) SERVER SYSTEM, CLIENT SYSTEM AND DIFFERENCE UPDATE SYSTEM

(75) Inventor: Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 552 days.

(21) Appl. No.: 10/120,363

(22) Filed: Apr. 12, 2002

(65) Prior Publication Data

US 2002/0188675 A1    Dec. 12, 2002

(30) Foreign Application Priority Data

Apr. 23, 2001  (JP)  ............................. 2001-124359

(51) Int. Cl.
*G06F 15/16* (2006.01)
(52) U.S. Cl. ...................... 709/201; 709/203; 719/318
(58) Field of Classification Search ................ 709/200; 719/318
See application file for complete search history.

(56) References Cited

U.S. PATENT DOCUMENTS

| 6,105,028 | A  | * | 8/2000  | Sullivan et al.  | ................ | 707/10  |
| 6,167,567 | A  | * | 12/2000 | Chiles et al.    | ................ | 717/173 |
| 6,489,980 | B1 | * | 12/2002 | Scott et al.     | ................ | 715/854 |
| 6,718,549 | B1 | * | 4/2004  | Narin et al.     | ................ | 717/178 |
| 6,742,025 | B2 | * | 5/2004  | Jennery et al.   | ................ | 709/220 |
| 6,839,757 | B1 | * | 1/2005  | Romano et al.    | ................ | 709/226 |
| 6,883,020 | B1 | * | 4/2005  | Taranto et al.   | ................ | 709/213 |

\* cited by examiner

*Primary Examiner*—William Thomson
*Assistant Examiner*—Andy Ho
(74) *Attorney, Agent, or Firm*—Foley & Lardner, LLP (57) ABSTRACT

A server system includes a data storage section, HTTP server, back-end server, difference update instruction issuing sections, event management section, and real-time communication/transmission control section. The data storage section stores data. The HTTP server responds to an information transmission request sent from a client via the Internet, extracts requested information from the data storage section, and sends the information to the client. The back-end server sends an event associated with updating of the requested information. The difference update instruction issuing sections receive the event from the back-end server and issue difference update instructions to update the requested information. The event management section selects one of the difference update instruction issuing sections on the basis of the initial state associated with the requested information, and notifies the selected initial data instruction issuing section of the event. The real-time communication/transmission control section sends, to the client, a plurality of difference update instructions issued by the difference update instruction issuing section which is notified of the event. A client system and difference update system are also disclosed.

11 Claims, 3 Drawing Sheets

SERVER SYSTEM, CLIENT SYSTEM AND DIFFERENCE UPDATE SYSTEM

BACKGROUND OF THE INVENTION

The present invention relates to a server system, client system, and difference update system which update differences between a server and clients which share information in real-time.

When a computer is connected to a network such as the Internet to browse the contents and the like of a Web sever constructed on the network through the computer, software called a Web browser is used. The Web browser allows a user to browse contents prepared in a Web server using, for example, HTTP (Hyper Text Transfer Protocol).

The contents acquired from a Web sever into a local computer with HTTP and browsed with the Web browser are generally updated by inputting an update instruction to the Web browser. In addition, the contents are automatically updated by the automatic updating function of the Web browser which is activated at predetermined intervals. Conventionally, updating of information in a browser is automatically executed in a pseudo-fashion by automatic updating performed at predetermined intervals by update button operation of the browser. Therefore, real-time communication between a server and a client is performed by installing software dedicated to HTML or downloading a JAVA program having a large size every time it is used, without using the browser.

In a conventional system, a dedicated program must be downloaded from a server into a client. Since this operation takes time, it takes time to allow updating of a content to be changed. For this reason, a change in content on the server side cannot be quickly reflected in the corresponding information on the client side. This makes it impossible to maintain consistency of information. In addition, in the conventional system, as described above, since a dedicated program is used, a high development cost is required for such a program. Furthermore, a dedicated program to be prepared for each HTML provided must be prepared on the client side for each HTML with which the user browses. This requires the user to perform complicated operation.

SUMMARY OF THE INVENTION

It is an object of the present invention to provide a server system, client system, and difference update system which can maintain consistency of information between the server side and the client side.

It is another object of the present invention to provide a server system, client system, and difference update system which do not require a user on the client side to perform any complicated operation.

In order to achieve the above objects, according to the present invention, there is provided a server system comprising data storage means in which data is stored, requested information transmission control means for responding to an information transmission request sent from an information transmission request source via the Internet, extracting requested information from the data storage means, and sending the information to the information transmission request source, information management means for sending an event associated with updating of the requested information, a plurality of difference update instruction issuing means for receiving the event from the information management means and issuing difference update instructions to update the requested information, event management means for selecting one of the difference update instruction issuing means on the basis of an initial state associated with the requested information which is sent from the information transmission request source, and notifying the selected initial data instruction issuing means of the event from the information management means, and transmission control means for sending, to the information transmission request source, a plurality of difference update instructions issued by the difference update instruction issuing means which is notified of the event.

DESCRIPTION OF THE PREFERRED EMBODIMENTS

The present invention will be described in detail below with reference to the accompanying drawings.

Figure 1:
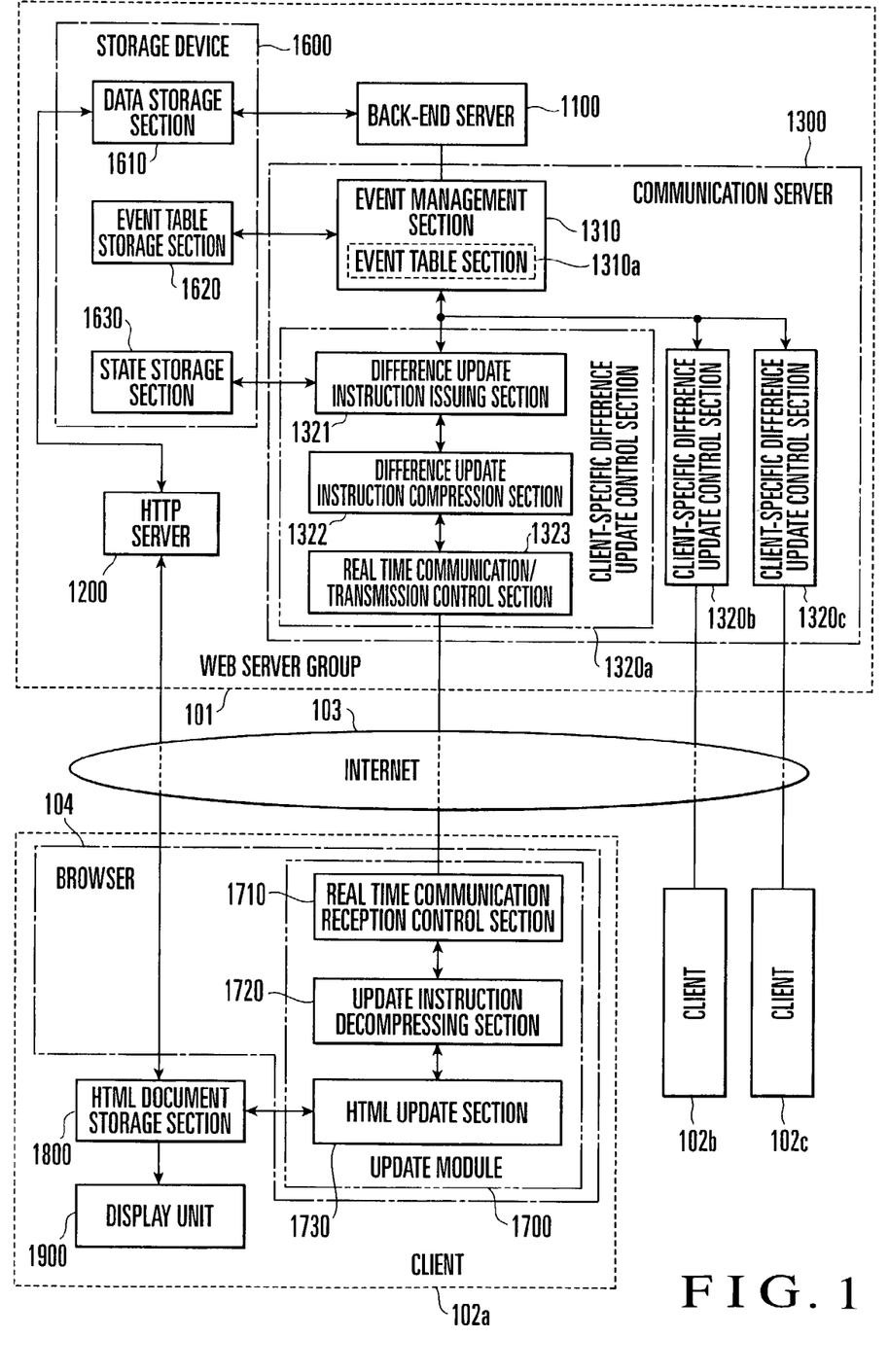
FIG. 1 is a block diagram showing a difference update system according to the first embodiment of the present invention.

FIG. 1 is a block diagram showing a difference update system according to the first embodiment of the present invention. The difference update system according to this embodiment is comprised of a Web server group 101 in which information such as HTML is prepared, and a plurality of clients 102a, 102b, and 102c each having a browser function of requesting and extracting information from the Web server group 101. The Web server group 101 and clients 102a, 102b, and 102c are connected to each other via the Internet 103.

The Web server group 101 includes a back-end server (information management means) 1100, HTTP server (requested information transmission control means) 1200, communication server 1300, and storage device 1600. The back-end server 1100 is formed from a known back-end system and designed to notify the communication server 1300 of an event corresponding to a content change (update) of HTML which the server manages. The back-end server 1100 accesses a data storage section 1610 in the storage device 1600 as a database.

The HTTP server 1200 is a server for processing the existing HTTP and designed to, for example, respond to an inquiry from the client 102a and transmit the HTML document or data read out from the menu bar 1601 to an HTML document storage section 1800 of the client 102a as the request source.

The communication server 1300 includes an event management section 1310 and client-specific difference update control sections 1320a, 1320b, and 1320c prepared for the respective clients. Assume, in this case, that three client-specific difference update control sections are respectively prepared for three clients, as shown in FIG. 1. The communication server 1300 is the basis for connecting the host controller 110 to each client in real-time and updating a difference in the HTML document or data that has already been sent to the client.

The event management section 1310 of the communication server 1300 transfers an event from the back-end server 1100 to one of the client-specific difference update control sections 1320*a*, 1320*b*, and 1320*c*. At this time, the event management section 1310 determines the transfer destination of the event in accordance with an event list in the event table stored in an event table storage section 1620, and transfers the event of the type registered.

The client-specific difference update control section 1320*a*, to which the event is transferred, includes a difference update instruction issuing section 1321, difference update instruction compression section 1322, and real-time communication/transmission control section 1323. The client-specific difference update control sections 1320*b* and 1320*c* also have the same arrangement as that of the client-specific difference update control section 1320*a*.

The client 102*a* includes a browser (information request reception means) 104 incorporated in an update module 1700 having a one-to-one correspondence with the client-specific difference update control section 1320*a*, the HTML document storage section 1800 which stores the HTML document extracted by the browser 104, and a display unit 1900 for displaying the HTML document extracted by the browser 104 and stored in the HTML document storage section 1800. The clients 102*b* and 102*c* also have the same arrangement as that of the client 102*a*.

The operation of the difference update system having the above arrangement will be described next.

First of all, in accordance with the operation done by the user of the client 102*a*, an HTML document transmission request is sent from the browser 104 to the Web server group 101. This transmission request is received by the HTTP server 1200. Upon reception of the transmission request, the HTTP server 1200 extracts the requested HTML document from the data storage section 1610 and sends it to the client 102*a*.

The HTML document sent from the Web server group 101 is received by the client 102*a* via the Internet 103 and stored in the HTML document storage section 1800. When the requested HTML document is received and stored in the HTML document storage section 1800, the update module 1700 in the browser 104 of the client 102*a* sends a connection request to the communication server 1300 in the Web server group 101. Upon reception of the connection request, the communication server 1300 starts the client-specific difference update control section 1320*a* to start communication control for difference update processing to be described below.

When the communication control is started, an initial state including, for example, information about the HTML document requested by the browser 104 is sent from the update module 1700 and stored in a state storage section 1630. Owing to this state storage section 1630, customized difference updating can be performed for each client type and timing. When the initial state is stored, the storage device 1600 records, on the event table storage section 1620, the event type used by an event table section 1310*a* of the event management section 1310. The event type recorded on the event table storage section 1620 is registered in the event table section 1310*a*. When an event arrives at the event management section 1310, the registered information is used to perform control to, for example, notify the difference update instruction issuing section 1321 in the specific client-specific difference update control section of the reception of the event.

When the back-end server 1100 changes the HTML document content in the data storage section 1610 afterward while the HTML document stored in the data storage section 1610 is browsed on the browser 104 of the client 102*a*, the event management section 1310 is also notified of the corresponding information as an event. Upon notification of this event from the host controller 110, the event management section 1310 looks up the event table storage section 1620 to acquire information about the browser 104 (update module 1700) which is using the HTML document to be updated which is notified by the event.

The event management section 1310 then selects a corresponding one of the client-specific difference update control sections 1320*a* to 1320*c* on the basis of the acquired information about the update module 1700, and notifies the difference update instruction issuing section 1321 in the selected section of an event. If, for example, the change made by the back-end server 1100 is associated with the HTML document requested by the client 102*a*, the event sent from the host controller 110 to the event management section 1310 is associated with the above HTML document.

The initial state concerning the state wherein the above HTML document is browsed by the client 102*a* is stored in the event table storage section 1620. Upon reception of the notification of the event from the back-end server 1100, the event management section 1310 can know from the event table storage section 1620 that the HTML document to be updated is held by the client 102*a*.

Upon specifying the client 102*a* which holds the HTML document in which the notified event should be reflected, the event management section 1310 notifies the client-specific difference update control section 1320*a* corresponding to the update module 1700 of the specified client 102*a* of the above event. In the client-specific difference update control section 1320*a* which has received this event, the difference update instruction issuing section 1321 generates a difference update instruction (Function) 2200 having a data configuration like that shown in FIG. 2A in accordance with the state variables stored in the state storage section 1630 and the received event.

Figure 2A:
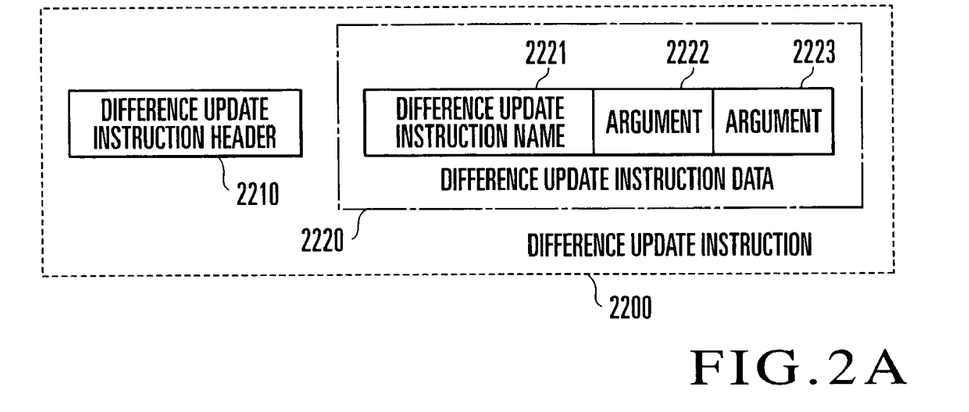
FIGS. 2A to 2C are views showing the arrangements of difference update instructions used in the difference update system in FIG. 1.
Figure 2B:
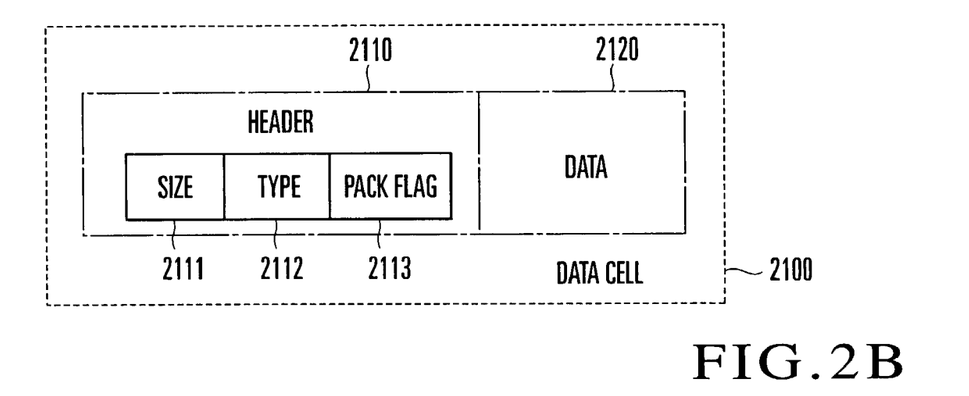

The data configuration will be described next. The difference update instruction 2200 is a module dependent on an application for changing a predetermined portion of an HTML document, and is constituted by a difference update instruction header 2210 and difference update instruction data 2220. The difference update instruction data 2220 is constituted by a difference update instruction name 2221 and a plurality of arguments 2222 and 2223. These difference update instruction data 2220, difference update instruction name 2221, and arguments 2222 and 2223 are formed from data cells 2100 (FIG. 2B).

The data cell 2100 is comprised of a header 2110 and data 2120. The header 2110 is comprised of a size 2111, type 2112, and pack flag 2113. The size 2111 indicates the size of the data 2120. With this size 2111, the sizes of the text and binary data constituting the data 2120 are indicated in byte size. The type 2112 indicates the instruction number of a difference update instruction. The pack flag 2113 indicates the configuration state of the data 2120. The pack flag 2113 makes it possible to identify the data 2120 as data constituted by a plurality of difference update instructions or a difference update instruction with an argument.

Since the data cells 2100 have such a unified structure, a decompression routine in the update module 1700 to be described later can be shared. This makes it possible to reduce the program size of the update module 1700.

The difference update instruction issuing section 1321 concurrently generates difference update instructions, each having the above configuration, in number equal to applications in which the difference should be reflected. When the HTML document stored in the data storage section 1610 is updated, applications in which this updating should be reflected are determined when the above initial state is sent and stored in the state storage section 1630. The difference update instructions to be generated are basic, general instructions including "add", "change", and "delete". Table 1 shows the types of difference update instructions.

TABLE 1

| Instruction Name | Argument | Function |
| --- | --- | --- |
| AppendElement | ParentId, siblingId, data, newId | addition of tag |
| ChangeElement | targetId, data | change of tag name |
| RemoveElement | Targeted | deletion of tag |
| SetAttribute | targetId, atrName, atrValue | setting of attribute for tag |
| RemoveAttribute | targetId, atrName | deletion of tag attribute |
| TextNodeChange | ParentId, data | addition of text |
| Command | StrCommand | arbitrary command |
| CommandList | strCommandList | arbitrary command line |

Each difference update instruction will be described next. In each prepared instruction, an XML element and attribute are defined, and a portion to be changed is specified by using an ID tag as a key which is present in the HTML document distributed to the HTML document storage section 1800 in advance. In Table 1, for example, the argument "ParentId" indicates the ID of a parent tag in a set of a plurality of tags, and the argument "siblingid" indicates the ID of a sibling tag. In addition, the argument "data" indicates a tag name; the argument "newId", the ID of a new tag; the argument "atrName", an attribute name; and the argument "atrValue", an attribute value.

Note that the instruction names "Command" and "CommandList" are used to implement arbitrary names. However, JavaScript on the browser side must be described independently. It is therefore preferable that such instructions are not used, unless, for example, a desired operation speed can be attained by a prepared method. "Command" indicates one instruction, and "CommandList" indicates a list of a plurality of instructions.

The instruction name "AppendElement" indicates a difference update instruction. If the argument "parentid" is not designated, a search for an addition point is made by using only the argument "siblingId". If the argument "siblingid" is empty in the difference update instruction with the instruction name "AppendElement", the last tag in a set of HTML tags becomes an addition point. If the argument "siblingid" is designated, an element is added in front of the designated HTML tag.

In practice, difference updating of an HTML document is often constituted by a plurality of difference update instructions. The plurality of difference update instructions generated in this manner are integrated into a difference update instruction package 2300 (FIG. 2C) by the difference update instruction compression section 1322, as shown in FIG. 2C.

Figure 2C:
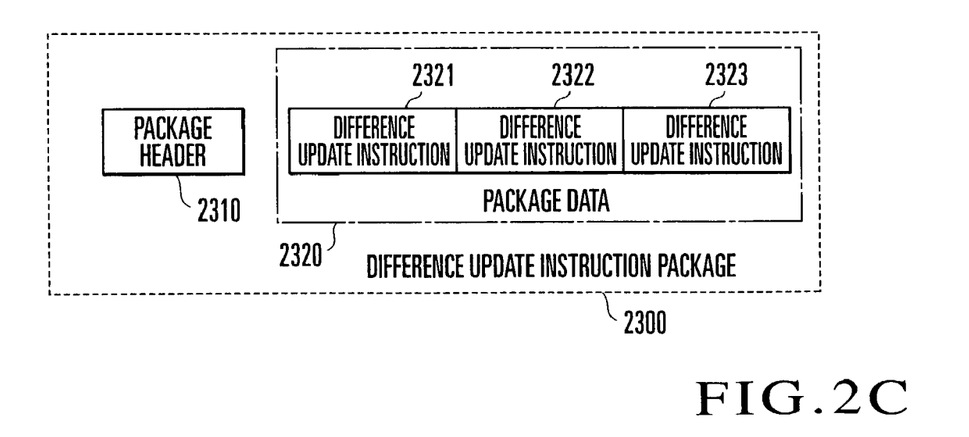

As shown in FIG. 2C, the difference update instruction package 2300 is comprised of a package header 2310 and package data 2320. The package data 2320 is formed by integrating a difference update instruction 2231, difference update instruction 2232, and difference update instruction 2233. Since this difference update instruction package 2300 is set as a transmission/reception message unit, a set of consecutive difference update instructions 2200 are inseparably processed.

The plurality of difference update instructions to be integrated by the difference update instruction compression section 1322 and consecutively processed are sent from the real-time communication/transmission control section 1323 to the client 102a. The difference update instructions sent from the real-time communication/transmission control section 1323 of the client-specific difference update control section 1320a are received by the real-time communication reception control section 1710 of the client 102a via the Internet 103. Upon reception of the all package of difference update instructions integrated into one set, the real-time communication reception control section 1710 transfers this package to an update instruction decompressing section 1720.

Upon reception of the package of instructions, the update instruction decompressing section 1720 decompresses (decomposes) the package into difference update instructions to form a plurality of consecutive difference update instructions. The update instruction decompressing section 1720 decompresses each difference update instruction into a difference update instruction name and arguments. Since each data has the same structure as described above, the update instruction decompressing section 1720 can perform all this decompressing operation following one type of decompression routine.

Each difference update instruction name and arguments decompressed by the update instruction decompressing section 1720 are transferred to an HTML update section 1730. Of the difference update instructions prepared in advance, a corresponding difference update instruction is executed. As a consequence, the HTML document stored in the HTML document storage section 1800 and displayed on the display unit 1900 is updated. The HTML document to be updated always includes an ID tag. This ID tag is used as a key for designating an object to be rewritten.

The difference update instructions prepared in the HTML update section 1730 correspond to the difference update instructions issued by the difference update instruction issuing section 1321. In other words, the difference update instruction issuing section 1321 issues only a difference update instruction corresponding to one of the difference update instructions prepared in the HTML update section 1730. As a consequence, the update module 1700 can be shared. As described above, since the update module 1700 is designed to have only eight instructions, the size of the update module 1700 can be suppressed small. This can shorten the starting time of the module.

As described above, the set of difference update instructions sent from the client-specific difference update control section 1320a is decompressed, as it is, by the update instruction decompressing section 1720 and processed by the HTML update section 1730. Even if, therefore, a transmission delay occurs with respect to the update module 1700, the difference update instructions to be consecutively processed are executed without any interruption. This suppresses the occurrence of a disturbance in the display state of the HTML document displayed on the display unit 1900.

This embodiment will be described next by taking one example. Assume that the Web server group 101 is a Web site, and an HTML document for providing stock price information is prepared in the data storage section 1610. Assume also that in the client 102a, the above HTML document (stock price information HTML) is stored in the HTML document storage section 1800 and is being displayed on the display unit 1900. Assume that in the source data forming the HTML document displayed on the display unit 1900, "1000" is designated as the ID of a FONT tag for displaying a stock price.

When the back-end server 1100 which is observing stock dealings generates an event of a stock price variation notification indicating that the stock price has changed to 120,000 yen, the event management section 1310 notifies the client-specific difference update control section 1320a of the above event. In the client-specific difference update control section 1320a which has received the event of the price variation notification, the difference update instruction issuing section 1321 issues a plurality of difference update instructions required to reflect this change in the stock price information HTML described above.

The plurality of issued difference update instructions are integrated into one set by the difference update instruction compression section 1322 and sent to the client 102a by the real-time communication/transmission control section 1323. The set of sent update instructions is received by the real-time communication reception control section 1710 of the client 102a, decompressed by the update instruction decompressing section 1720, and processed by the HTML update section 1730. As a consequence, the stock price corresponding to the ID1000 in the stock price information HTML in the client 102a is changed on the basis of the changed stock price, and the font color is changed to vermilion to indicate the change.

The instructions issued for this change are a difference update instruction with the instruction name "TextNodeChange", "1000" as the argument "Parented", and "120,000 yen" as the argument "data" and a difference update instruction with the instruction name "SetAttribute", "1000" as the argument "targetId", "COLOR" as the argument "atrName", and "RED" as the argument "atrValue", which are shown in Table 1.

With the same operation, the current time at the stock exchange can be displayed in real-time as well as the stock price. For example, timer events notified from the back-end server 1100 at 1-sec intervals may be defined such that the ID of a FONT tag in the source file of the stock price information HTML, which indicates the display time of the stock price information HTML on the display screen of the display unit 1900, is designated as "SERVERTIME".

If the stock price information HTML is created in this manner, a difference update instruction to rewrite "SERVERTIME" in the source file is issued every time a timer event is sent from the back-end server 1100 and received by the difference update instruction issuing section 1321. This difference update information has the instruction name "TextNodeChange", "SERVERTIME" as the argument "Parented", and "15:00:00, Mar. 12, 2001" as the argument "data", which are shown in Table 1.

Information such as the closing of a stock market can be reflected in the stock price information HTML at the closing time and displayed on the display unit 1900. In this case, when an event associated with the closing of the stock market is sent from the back-end server 1100 and received by the difference update instruction issuing section 1321, a difference update instruction is issued to newly display closing information in the source file of the stock price information HTML. This difference update instruction has the instruction name "AppendElement", "ROOTTAGE" as the argument "Parented", none for the argument "siblingId", "closed" as the argument "data", and "ENDVIEW" as the argument "newId", which are shown in Table 1. Note that "ROOTTAGE" is a tag for indicating the root of an area where "closed" is displayed.

With this difference update instruction, the stock price information HTML is changed to display "closed". The number of clients in which such a change in stock price should be reflected may become enormous. In such a case, a plurality of communication servers may be dynamically installed to distribute the load among the communication serves. Different difference update instruction issuing sections need to be prepared for different applications (HTML) subjected to changing and updating. However, modules equal in number to the types of applications intended to be used can be prepared, communication servers can be dynamically assigned to applications with high traffic.

Figure 3:
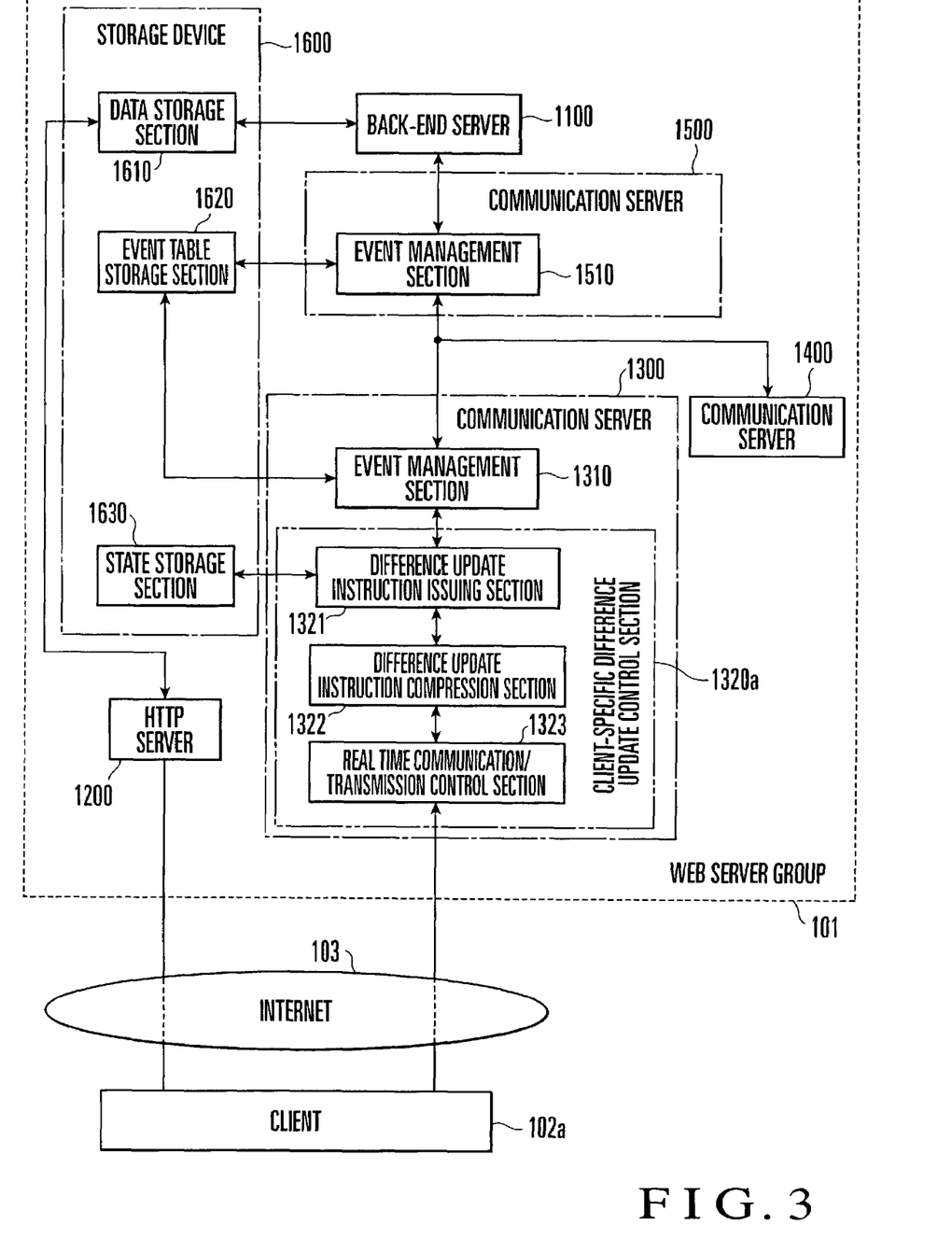
FIG. 3 is a block diagram showing a difference update system according to the second embodiment of the present invention.

In the second embodiment shown in FIG. 3, for example, a communication server 1400 and communication server 1500 may be added to the system according to the first embodiment shown in FIG. 1. In this case, the communication server 1400 has the same function as that of the communication server 1300. In addition, an update module of a client 102a (the same as the update module 1700 of client 102a in FIG. 1) selects a communication server to which it is connected. For example, the update module of the client 102a (in FIG. 3) may select the communication server 1400 instead of the communication server 1300 depending on the traffic state. Methods of selecting a communication server may be a method of describing an HTML document so as to distribute load among servers to be selected at the time of transmission of the HTML document from an HTTP server 1200, and a method of installing a gateway between some communication servers to distribute IP addresses.

The communication server 1500 has the same function as that of the communication server 1300, and functions as a host communication server to which the communication servers 1300 and 1400 and other communication servers are connected. In this case, an event table storage section 1620 stores the sum total of event tables held in the respective communication servers 1300 and 1400. In this state, the communication server 1500 is connected to a back-end server 1100 to acquire events. An event management section 1510 then looks up the event table storage section 1620 to distribute the acquired events to the communication servers 1300 and 1400.

Note that the difference update system constituted by the Web server group 101 and the respective clients can also be formed by a computer system. For example, the function of the Web server group can be obtained when the computer system executes the following functions according to a program: the request information transmission function of receiving an information transmission request sent via the Internet, extracting the requested information from the data storage section, and sending it to the information transmission request source; the information management function of sending an event associated with updating of the requested information; the plurality of difference update instruction issuing functions of receiving the event from the information management function and issuing difference update instructions to update the requested information; the event management function of selecting a corresponding difference update instruction issuing function on the basis of the initial state associated with the requested information sent from the source and notifying the selected difference update instruction issuing function of the event from the information management function; and the transmission control function of sending the difference update instruction issued by the difference update instruction issuing function which is selected by the event management function and notified of the event.

The function of a client can be obtained when the computer system executes the following functions according to a program: the information request reception function of sending an information transmission request to a predetermined server system via the Internet to receive requested information from the server system, and sending an initial state associated with the received requested information to the server system; the storage function of storing the request information received by the information request reception function in a storage section; the display function of causing a display unit to display the requested information stored in the storage section; the reception control function of receiving difference update instructions to update the requested information from the server system; and the update function of updating the requested information in accordance with the difference update instructions received by the reception control function.

As has been described above, according to the present invention, difference update instruction issuing sections corresponding to the respective clients are prepared on the server system side to allow the server system, instead of the request source, to issue difference update instructions to update the requested information sent to a client system. Even if, therefore, a change or addition of information occurs with respect to the requested information used in a client system, there is no need to change, for example, the arrangement of an information request reception section (browser) on the client system side. According to the present invention, the user of a client system need not perform any complicated operation, and the consistency of information on the server side and client side can be easily maintained.

What is claimed is:

1. A server system comprising:
   a data storage section in which data is stored;
   a requested information transmission control section for responding to an initial information transmission request sent from a given information transmission request source via the Internet, extracting requested information from said data storage section, and sending the information to the given information transmission request source;
   an information management section for sending an event associated with updating of the requested information, said event causing real-time updating of a content of a web page being browsed by a browser of the given information transmission request source without an update request from the given information transmission request source;
   a plurality of difference update instruction issuing sections corresponding to a plurality of client terminals, said plurality of client terminals including said given information transmission request source, each of said plurality of client terminals receiving individualized requested information from said data storage section via said requested information transmission control section, one difference update instruction issuing section of said plurality of difference update instruction issuing sections receiving the event from said information management section and issuing a plurality of difference update instructions to update the requested information;
   an initial state storage section for storing an initial state associated with the requested information sent to the given information transmission request source;
   an event management section for selecting said one difference update instruction issuing section of said plurality of difference update instruction issuing sections on the basis of the initial state stored in the initial state storage section, and notifying said selected one difference update instruction issuing section of the event from said information management section; and
   a plurality of transmission control sections each for transmitting a corresponding plurality of difference update instructions to a corresponding client terminal of the plurality of client terminals individually for one or more corresponding events associated with updating of corresponding requested information that has been sent to the corresponding client terminal;
   wherein a transmission control section of the plurality of transmission control sections allows for sending, to the given information transmission request source, said plurality of difference update instructions issued by said selected one difference update instruction issuing section which is notified of the event.

2. A system according to claim 1, wherein the plurality of difference update instructions are instructions that can be executed by the given information transmission request source.

3. A system according to claim 1, wherein
   said system further comprises an instruction compressing section for integrating said plurality of difference update instructions from said one of said plurality of difference update instruction issuing sections into one set and outputting the set of difference update instructions,
   said one of said plurality of difference update instruction issuing sections outputs said plurality of difference update instructions associated with updating of requested information which corresponds to said event to said instruction compressing section, and
   said transmission control section sends the set of difference update instructions output from said instruction compressing section to the given information transmission request source.

4. A client system comprising:
   a requested information reception section, including a browser, for receiving requested information from a server system which responds to an initial information transmission request sent via the Internet, and sending a connection request to the server system to cause the server system to associate a difference update control section of a plurality of difference update control sections of the server system with the client system the plurality of difference update control sections associable with a plurality of client terminals that are each capable of receiving individualized requested information from a data storage section of the server system via a requested information transmission control section of the server system, and sending an initial state associated with the received requested information to the server system, said server system providing web content to said requested information reception section and, in response to an event received in said server system, providing by the difference update control section updated web content of a web page currently being browsed by said browser of said requested information reception section without the requested information reception section sending an update request to the server;

a storage section in which the requested information output from said requested information reception section is stored;

a display section for displaying the requested information stored in said storage section;

a reception control section for receiving a plurality of difference update instructions to update the requested information from said difference update control section of said server system, said plurality of difference update instructions issued by said difference update control section after the difference update control section receives an event associated with updating the requested information from an information management section of the server system; and an update section for performing real-time updating of the requested information in accordance with the plurality of difference update instructions output from said reception control section.

5. A system according to claim 4, wherein the plurality of difference update instructions are instructions that can be executed by said update section.

6. A system according to claim 4, wherein
said system further comprises an update instruction decompressing section for decompressing a set of difference update instructions output from said reception control section into individual difference update instructions,
said reception control section receives the set of difference update instructions obtained by integrating the plurality of difference update instructions to update the requested information, and outputs the set of difference update instructions to said update instruction decompressing section, and
said update section updates the requested information on the basis of the individual difference update instructions output from said update instruction decompressing section.

7. A system constituted by a server system and a plurality of client systems connected to said server system via the Internet,
each of said client systems including:
a requested information reception section, including a browser, for receiving requested information from the server system which responds to an initial information transmission request sent via the Internet, and sending an initial state associated with the received requested information to the server system, said server system providing web content to said requested information reception section and, in response to an event received in said server system, providing updated web content of a web page currently being browsed by said browser of said requested information reception section without the requested information reception section sending an update request to the server;
a storage section in which the requested information output from said requested information reception section is stored,
a display section for displaying the requested information stored in said storage section,
a reception control section for receiving a difference update instruction to update the requested information from said server system, and
an update section for performing real-time updating of the requested information in accordance with the difference update instruction output from said reception control section, and said server system including:
a data storage section in which data is stored;
a requested information transmission control section for responding to an information transmission request sent from an information transmission request source via the Intemer, extracting requested information from said data storage section, and sending the information to the information transmission request source,
an information management section for sending an event associated with updating of the requested information, said event causing real-time updating of said web content of said web page currently being browsed by said browser of the information transmission request source without an update request from the information transmission request source,
a plurality of difference update instruction issuing sections corresponding to the plurality of client system, said plurality of client systems including said information transmission request source, each of said plurality of client systems receiving individualized requested information from said data storage section via said requested information transmission control section, one difference update instruction issuing section of said plurality of difference updating instruction issuing sections receiving the event from said information management section and issuing a plurality of difference update instructions to update the requested information,
an initial state storage section for storing an initial state associated with the requested information sent to the information transmission request source;
an event management section for selecting said one difference update instruction issuing section of said plurality of difference update instruction issuing sections on the basis of the initial state stored in the initial state storage section, and notifying said selected one difference update instruction issuing section of the event from said information management section, and
a plurality of transmission control sections each for transmitting a corresponding plurality of difference update instructions to a corresponding client system of the plurality of client systems individually for one or more corresponding events associated with update of corresponding requested information that has been sent to the corresponding client terminal;
wherein a transmission control section of the plurality of transmission control sections allows for sending, to the information transmission request source, said plurality of difference update instructions issued by said selected one difference update instruction issuing section which is notified of the event.

8. A system according to claim 7, wherein the plurality of difference update instructions are instructions that can be executed by the information transmission request source.

9. A system according to claim 7, wherein
said server system further comprises an instruction compressing section for integrating said plurality of difference update instructions from said one of said plurality of difference update instruction issuing sections into one set and outputting the set of difference update instructions,
said one of said plurality of difference update instruction issuing sections outputs said plurality of difference update instructions associated with updating of requested information which corresponds to said event to said instruction compressing section, said transmission control section sends the set of difference update instructions output from said instruction compressing section to the information transmission request source, said client system further comprises an update instruction decompressing section for decompressing a set of difference update instructions output from said reception control section into individual difference update instructions, said reception control section receives the set of difference update instructions obtained by integrating the plurality of difference update instructions to update the requested information, and outputs the set of difference update instructions to said update instruction decompressing section, and said update section updates the requested information on the basis of the individual difference update instructions output from said update instruction decompressing section.

10. A computer readable medium storing a difference update program, which, when operating on a computer, causes the computer to execute the following functions:

a requested information transmission control function of responding to an initial information transmission request sent from a given information transmission request source via the Internet, extracting requested information from a data storage section, and sending the information to the given information transmission request source;

an information management function of sending an event associated with updating of the requested information, said event causing real-time updating of a content of a web page being browsed by a browser of the given information transmission request source without an update request from the given information transmission request source;

a plurality of difference update instruction issuing functions corresponding to a plurality of client terminals, said plurality of client terminals including said given information transmission request source, each of said plurality of client terminals receiving individualized requested information via said requested information transmission control function, one difference update instruction issuing function of said plurality of difference update instruction issuing functions receiving the event from the information management function and issuing a plurality of difference update instructions to update the requested information;

an initial state storage function for storing an initial state associated with the requested information sent to the given information transmission request source;

an event management function of selecting said one difference update instruction issuing functions of the plurality of difference update instruction issuing functions on the basis of the initial state stored in the initial state storage function, and notifying the selected one different update instruction issuing function of the event from the information management function; and a plurality of transmission control functions each of transmitting a corresponding plurality of difference update instructions to a corresponding client terminal of the plurality of client terminals individually for one or more corresponding events associated with updating of corresponding requested information that has been sent to the corresponding client terminal;

wherein a transmission control function of the plurality of transmission control functions is a function of sending, to the given information transmission request source, said plurality of difference update instructions issued by the selected one difference update instruction issuing function which is notified of the event.

11. A computer readable medium storing a difference update program, which, when operating on a computer, causes the computer to execute the following functions:

a requested information reception function, including a browser function, of receiving requested information from a server system which responds to an initial information transmission request sent via the Internet, and sending a connection request to the server system to cause the server system to associate a difference update control section of a plurality of difference update control sections of the server system with the computer the plurality of difference update control sections associable with a plurality of client terminals that are each capable of receiving individualized requested information from a data storage section of the server system via a requested information transmission control section of the server system, and sending an initial state associated with the received requested information to the server system, said server system providing to said requested information reception function web content and, in response to an event received in said server system, providing by the difference update control section updated web content of a web page currently being browsed by said browser of said requested information reception function without the requested information reception function sending an update request to the server system;

a storage function of storing the requested information output from the requested information reception function in a storage section;

a display function of displaying the requested information stored in the storage function;

a reception control function of receiving a plurality of difference update instructions to update the requested information from said difference update control section of the server system, said plurality of difference update instructions issued by said difference update control section after the difference update control section receives an event associated with updating the requested information from an information management section of the server system; and an update function of performing real-time updating of the requested information in accordance with the plurality of difference update instructions output from the reception control function.

* * * * *